United States Patent
Heuermann et al.

(10) Patent No.: US 10,714,298 B2
(45) Date of Patent: Jul. 14, 2020

(54) X-RAY ARRANGEMENT WITH STATOR OPTIMIZED FOR MINIMAL FOCAL SPOT MOVEMENT

(71) Applicant: Siemens Healthcare GmbH, Erlangen (DE)

(72) Inventors: Oliver Heuermann, Adelsdorf (DE); Karin Soeldner, Schwaig (DE); Carsten Voss, Heroldsbach (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/254,667

(22) Filed: Jan. 23, 2019

(65) Prior Publication Data
US 2019/0237285 A1    Aug. 1, 2019

(30) Foreign Application Priority Data

Jan. 30, 2018 (DE) ........................ 10 2018 201 394

(51) Int. Cl.
*H01J 35/10* (2006.01)
*H02K 1/16* (2006.01)
(Continued)

(52) U.S. Cl.
CPC ............ *H01J 35/101* (2013.01); *H01J 35/10* (2013.01); *H02K 1/146* (2013.01); *H02K 1/16* (2013.01); *H02K 3/28* (2013.01)

(58) Field of Classification Search
CPC .......... H01J 35/101; H01J 35/10; H01J 35/14; H01J 35/305
See application file for complete search history.

(56) References Cited

U.S. PATENT DOCUMENTS

| | | | |
|---|---|---|---|
| 4,357,555 A * | 11/1982 | Gerkema | .............. F16C 33/122 |
| | | | 378/132 |
| 4,500,142 A | 2/1985 | Brunet | |
| (Continued) | | | |

FOREIGN PATENT DOCUMENTS

DE    102011081280 A1    2/2013

OTHER PUBLICATIONS

German Office Action and English translation thereof dated Dec. 10, 2018.
(Continued)

*Primary Examiner* — Yara B Green
(74) *Attorney, Agent, or Firm* — Harness, Dickey & Pierce, P.L.C.

(57) ABSTRACT

An X-ray arrangement includes a vacuum vessel, a rotating anode and a rotor of an electrical machine being non-rotatably interconnected rotatably mounted in the vacuum vessel, a stator being disposed in a region of the rotor, externally enclosing the vacuum vessel. The stator includes a laminated core which, viewed orthogonally to the axis of rotation, includes a yoke running around the axis of rotation and from which stator teeth extend onto the axis of rotation. A winding system is disposed in spaces between the stator teeth of the laminated stator core. The winding system includes windings, individual turns of the windings each being configured to respectively engage over a plurality of the stator teeth, and the stator being designed such that when identical phase voltages are applied to the individual phases of the winding system, the individual phases are each respectively configured to produce stray magnetic fields of identical magnitude.

10 Claims, 4 Drawing Sheets

(51) Int. Cl.
*H02K 1/14* (2006.01)
*H02K 3/28* (2006.01)

(56) References Cited

U.S. PATENT DOCUMENTS

| | | | |
|---|---|---|---|
| 6,628,034 B2 | 9/2003 | Jang et al. | |
| 6,658,085 B2 * | 12/2003 | Sklebitz | A61B 5/055 |
| | | | 378/137 |
| 7,152,301 B2 * | 12/2006 | Rittmeyer | H02K 3/28 |
| | | | 29/596 |
| 2010/0033043 A1 | 2/2010 | Seki et al. | |
| 2013/0208871 A1 | 8/2013 | Baral et al. | |

OTHER PUBLICATIONS

German Decision to Grant and English translation thereof dated Feb. 15, 2019.
German Office Action for German Application No. DE102018201394.2 dated Dec. 10, 2018.

* cited by examiner

X-RAY ARRANGEMENT WITH STATOR OPTIMIZED FOR MINIMAL FOCAL SPOT MOVEMENT

PRIORITY STATEMENT

The present application hereby claims priority under 35 U.S.C. § 119 to German patent application number DE 102018201394.2 filed Jan. 30, 2018, the entire contents of which are hereby incorporated herein by reference.

FIELD

Embodiments of the invention generally relate to an X-ray arrangement. In at least one embodiment, the X-ray arrangement may have one or more of the following:
wherein the X-ray arrangement has a vacuum vessel,
wherein a rotating anode and a rotor of an electrical machine are disposed in the vacuum vessel,
wherein the rotating anode and the rotor are non-rotatably interconnected and are rotatably mounted in the vacuum vessel so that the rotating anode and the rotor are rotatable about an axis of rotation,
wherein, viewed in the direction of the axis of rotation, there is disposed in the region of the rotor a stator which encloses the vacuum vessel externally in a radial manner with respect to the axis of rotation,
wherein the rotor and stator together constitute a rotary electrical machine by which the rotating anode is rotated about the axis of rotation,
wherein the stator has a laminated stator core which, viewed orthogonally to the axis of rotation, has a yoke running around the axis of rotation and from which stator teeth extend to the axis of rotation, and/or
wherein a multi-phase winding system is disposed in the spaces between the stator teeth of the laminated stator core.

BACKGROUND

An X-ray arrangement is generally known. Reference is made purely by way of example to DE 10 2011 081 280 A1 and U.S. Pat. No. 4,500,142 A.

In the operation of an X-ray arrangement, a cathode is used to produce an electron beam which is directed onto an anode. The point on which the electron beam is incident is termed the focal point. The X-rays are generated in the focal point.

The electron beam heats up the focal point. In order to prevent overheating of the focal point, the anode is often designed as a rotating anode which is rotated about an axis of rotation during operation. The rotation is produced by way of an electrical machine, the rotor of which is disposed together with the rotating anode inside a vacuum vessel and the stator of which is disposed outside the vacuum vessel.

Optimum imaging requires that during operation of the X-ray arrangement the focal point is static, i.e. does not move, or at least moves only slightly relative to the X-ray arrangement which, as an entity, does not rotate about the axis of rotation of the X-ray arrangement. As the X-ray-generating electron beam can be affected by electromagnetic fields, it is therefore necessary to keep the effect of the electromagnetic fields as constant as possible.

An important influencing factor are the stray fields emerging from the stator when the rotor is being driven. These stray fields cause focal point movements which can be in the region of several 100 µm viewed both in the direction around the axis of rotation and orthogonally thereto. The resulting imaging disturbances and errors are often non-negligible, but at the very least disadvantageous.

From DE 10 2011 081 280 A1 it is known to implement the winding system of the stator as a yoke winding. Such a winding system ensures that the focal point moves less than approximately 50 µm both in the direction viewed around the axis of rotation and orthogonally thereto. However, a yoke winding is complicated to manufacture and therefore cost-intensive.

It has already also been proposed to reduce the current applied to the winding system of the stator during active operation of the X-ray arrangement, i.e. while the X-rays are being emitted, or even disconnect it completely.

SUMMARY

The inventors have discovered that although the above approach may result in significantly reduced movement of the focal point, it does not always prove practicable. The inventors have discovered that if the bearings of the rotating anode are designed as slide bearings, the frictional forces within the bearing are too high, so that even in the event of complete disconnection of the power supply, the rotation of the rotating anode would decrease too quickly.

At least one embodiment of the present invention refines an X-ray arrangement which is both inexpensive and wherein the focal point is stable both viewed in the direction around the axis of rotation and orthogonally thereto.

At least one embodiment of the present invention is directed to an X-ray arrangement. Advantageous embodiments of the X-ray arrangement are set forth in the claims.

According to at least one embodiment of the invention, an X-ray arrangement comprises a vacuum vessel,
wherein a rotating anode and a rotor of an electrical machine are disposed in the vacuum vessel,
wherein the rotating anode and the rotor are non-rotatably interconnected and are rotatably mounted in the vacuum vessel so that the rotating anode and the rotor can be rotated about an axis of rotation,
wherein, viewed in the direction of the axis of rotation, there is disposed in the region of the rotor a stator which externally encloses the vacuum vessel in a radial manner with respect to the axis of rotation,
wherein the rotor and the stator together constitute a rotary electrical machine by which the rotating anode is rotated about the axis of rotation,
wherein the stator has a laminated core which, viewed orthogonally to the axis of rotation, has a yoke running around the axis of rotation and from which stator teeth extend onto the axis of rotation,
wherein a winding system having a plurality of phases is disposed in the spaces between the stator teeth of the laminated stator core, wherein
the winding system comprises windings, the individual turns of which engage over a plurality of stator teeth in each case, and
the stator is designed such that when identical phase voltages are applied to the individual phases, the phases produce stray magnetic fields of identical magnitude in each case.

BRIEF DESCRIPTION OF THE DRAWINGS

The above described characteristics, features and advantages of this invention and the manner in which they are achieved will become clearer and more readily understandable in conjunction with the following description of the example embodiments which will be explained in greater detail with reference to the accompanying schematic drawings in which.

DETAILED DESCRIPTION OF THE EXAMPLE EMBODIMENTS

Figure 1:
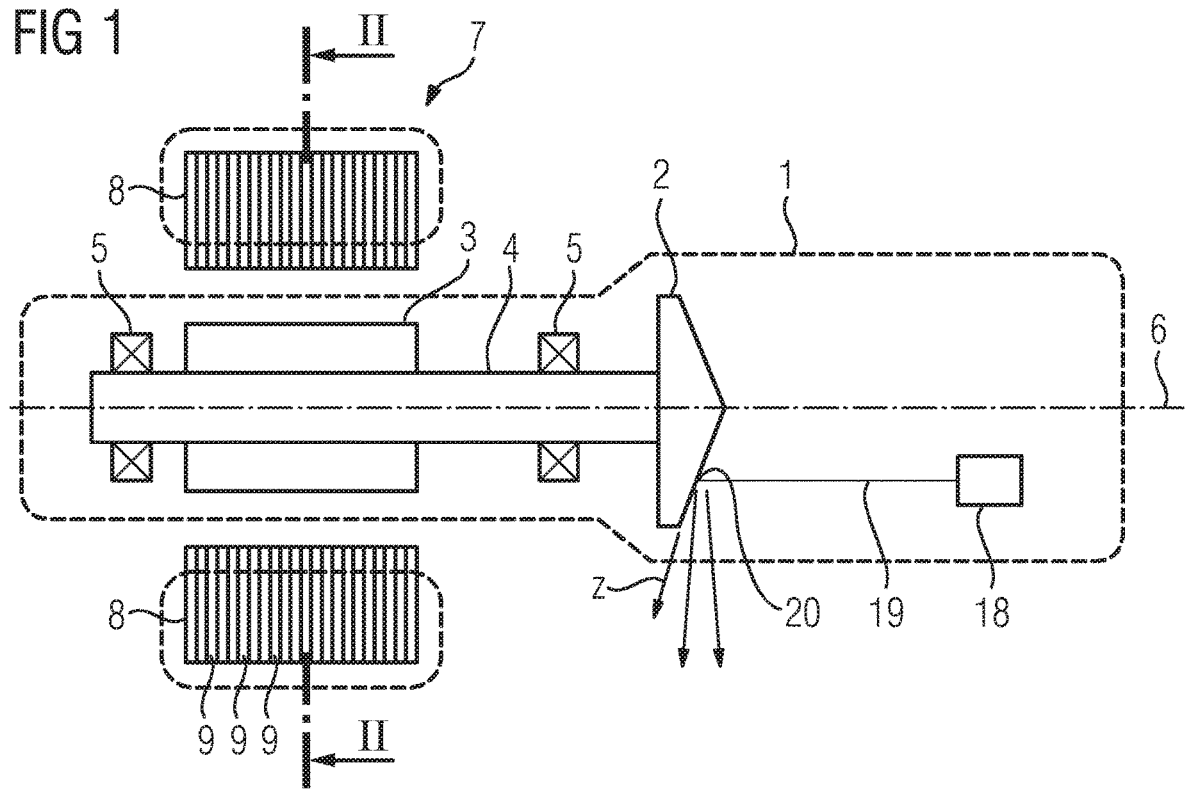
FIG. 1 shows a longitudinal section through an X-ray arrangement.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to at least one embodiment of the invention, an X-ray arrangement is designed such that
  the winding system has windings whose individual turns engage over a plurality of stator teeth in each case, and
  the stator is designed such that when identical phase voltages are applied to the individual phases, the phases each cause stray magnetic fields of equal magnitude.

Because the winding system is designed such that it has windings whose individual turns engage over a plurality of stator teeth in each case, the winding system of the stator can be simply, reliably and inexpensively produced. Because the stator is designed such that, when identical phase voltages are applied to the individual phases, the phases each cause stray magnetic fields of equal magnitude, it can nevertheless be ensured that the stray fields vary only very slightly over time and consequently the focal point moves only slightly as the rotating anode rotates. In particular, the equalizing of the stray magnetic fields produces a highly symmetrical fluctuation of the stray magnetic fields during rotation of the rotating anode.

In such a winding system, the phases of the winding system each comprise an upper part-winding overhang above the laminated stator core and a lower part-winding overhang below the laminated stator core, viewed in the direction of the axis of rotation. The upper part-winding overhangs are disposed closer to the rotating anode than the lower part-winding overhangs. In addition, the upper part-winding overhangs are normally disposed one above the other, viewed in the direction of the axis of rotation, so that the upper part-winding overhangs comprise at least one outer upper part-winding overhang and one inner upper part-winding overhang. Viewed in the direction of the axis of rotation, the outer upper part-winding overhang is the upper part-winding overhang farthest from the laminated stator core. Conversely, viewed in the direction of the axis of rotation, the inner upper part-winding overhang is the upper part-winding overhang farthest from the rotating anode. A similar sequence normally also obtains for the lower part-winding overhangs. In this case, however, the critical factor is the upper part-winding overhangs which are disposed closer to the rotating anode than the lower part-winding overhangs.

Equalization of the stray magnetic fields produced by the phases can be facilitated in particular by providing the phase which comprises the outer upper part-winding overhang with a larger number of turns than the other phases. Alternatively or in addition, equalization can be facilitated by providing the phase which comprises the inner upper part-winding overhang with a smaller number of turns than the other phases.

The laminated stator core normally includes a plurality of laminations which are stacked one on top of the other viewed the direction of the axis of rotation. In the past, the stator laminations are often electrically interconnected via a welded joint running parallel to the axis of rotation on the outer circumference of the laminated stator core. Another option for equalizing the stray magnetic fields produced by the phases is to at least partially break an electrical interconnection of consecutive stator laminations in the direction of the axis of rotation. In the simplest case, this can be implemented simply by dispensing with the welded joint of the prior art. Alternatively, it may be advisable to selectively break the welded joint at some points only.

As shown in FIG. 1, an X-ray arrangement comprises a vacuum vessel 1. Disposed in the vacuum vessel 1 are, among other things, a rotating anode 2 and a rotor 3 of an electrical machine. The rotating anode 2 and the rotor 3 are non-rotatably disposed on a common shaft 4 and therefore non-rotatably interconnected. The shaft 4 is rotatably mounted in bearings 5 so that the rotating anode 2 and the rotor 3 can rotate about an axis of rotation 6.

Where the terms "axial", "radial" and "tangential" are used, they are always referred to the axis of rotation 6. "Axial" is a direction parallel to the axis of rotation 6. "Radial" is a direction orthogonal to the axis of rotation 6 onto or away from the axis of rotation 6. "Tangential" is a direction that is orthogonal both to the axial direction and to the radial direction. "Tangential" is therefore a direction which, in the case of a constant axial position, is oriented at a constant radial distance about the axis of rotation 6.

To drive the rotor 3 there is disposed in the region of the rotor 3—viewed in the direction of the axis of rotation 6—a stator 7 which encloses the vacuum vessel 1 externally in a radial manner with respect to the axis of rotation 6. The rotor 3 and the stator 7 together constitute a rotary electrical machine by which, during operation of the X-ray arrangement, the rotating anode 2 is rotated about the axis of rotation 6. The electrical machine can be implemented, for example, in the manner of an asynchronous machine.

Figure 2:
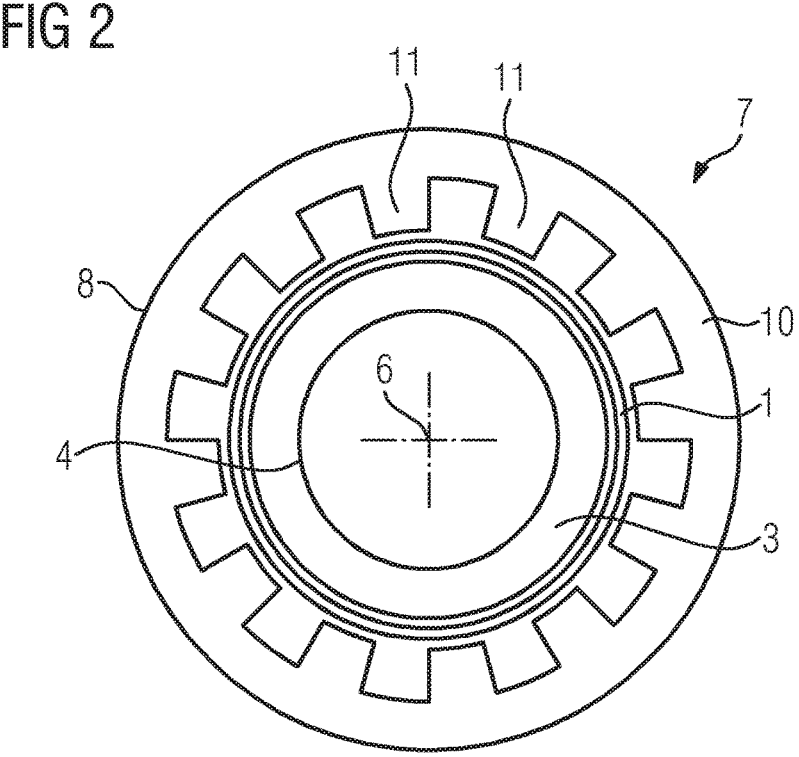
FIG. 2 shows a section through a stator along a line II-II in FIG. 1.
Figure 3:
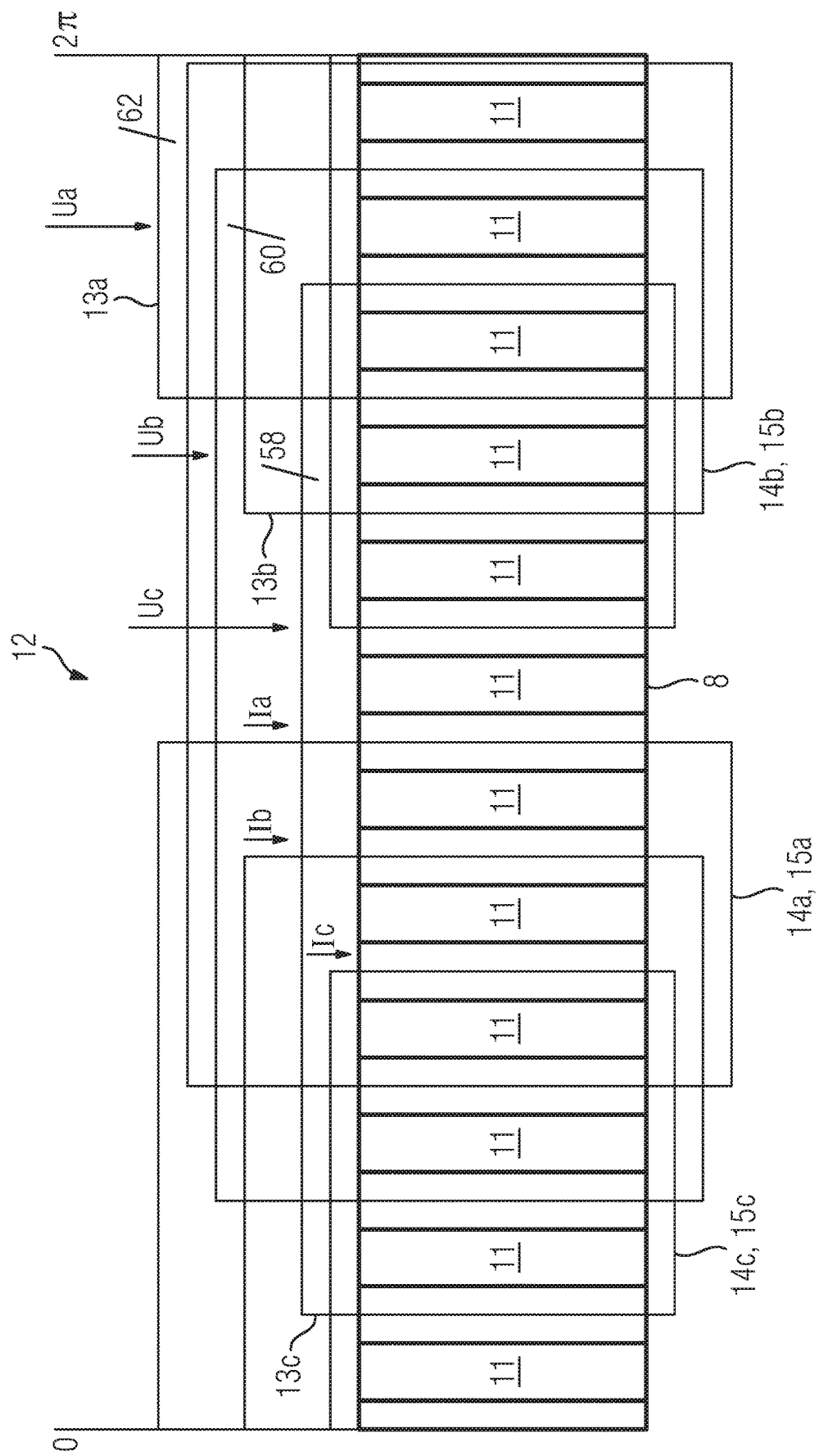
FIG. 3 shows stator of FIG. 2 in unrolled form.

The stator 7 has a laminated core 8. The stator's laminated core 8 includes a plurality of laminations 9 which are stacked one on top of the other viewed in the direction of the axis of rotation 6. As shown in FIG. 2, the laminated stator core 8 has a yoke 10. The yoke 10 runs round the axis of rotation 6. Stator teeth 11 extend from the yoke 10 onto the axis of rotation 6. As shown in FIG. 3, a winding system 12 is disposed in the spaces (slots) between the stator teeth 11 of the laminated stator core 8. The winding system 12 has a plurality of phases 13. Generally three phases 13 are present. However, designs of the winding system 12 with only two phases 13 or more than three phases 13 are also conceivable.

In FIG. 3 the phases 13 are additionally provided with a lower-case letter (a, b or c) in order to be able to differentiate them from one another if necessary. Where required, some other reference characters will also be supplemented by a lower-case letter (a, b or c) in the following in order to be able to differentiate them from one another if necessary. If any such reference character is supplemented by a lower-case letter, the correspondingly denoted element relates to the corresponding phase 13, i.e. a reference character 14a relates to the phase 12a, for example.

The winding system 12 comprises windings 14, the individual turns 15 of which each engage over a plurality of stator teeth 11. The winding system 12 is therefore implemented as a so-called distributed winding system 12. Such winding systems 12 will be familiar to persons skilled in the art. They normally have superior electrical and electromagnetic properties compared to tooth windings.

Figure 4:
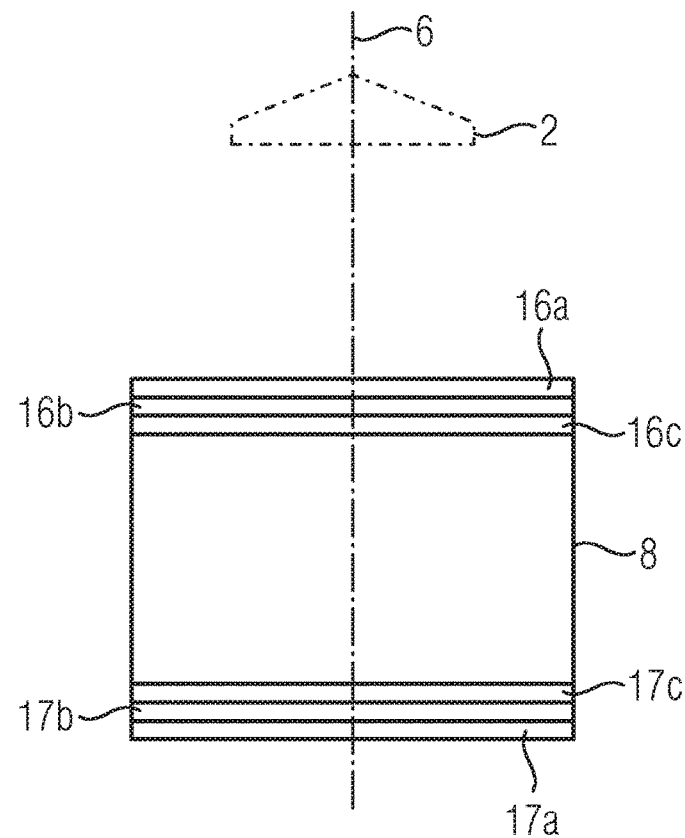
FIG. 4 shows a side view of the stator of FIG. 2.

As shown in FIG. 4, the phases 13 of the winding system 12 each comprise an upper part-winding overhang 16 above the laminated stator core 8, viewed in the direction of the axis of rotation 6. The phases 13 of the winding system 12 each additionally comprise a lower part-winding overhang 17 below the laminated stator core 8, viewed in the direction of the axis of rotation 6. The upper part-winding overhangs 16 are disposed closer to the rotating anode 2 than the lower part-winding overhangs 17, viewed in the direction of the axis of rotation 6.

In addition, the upper part-winding overhangs 16 are disposed one above the other, viewed in the direction of the axis of rotation 6. The upper part-winding overhangs 16 therefore comprise at least one outer upper part-winding overhang 16a and one inner upper part-winding overhang 16c. The outer upper part-winding overhang 16a is the upper part-winding overhang 16a farthest from the laminated stator core 8, viewed in the direction of the axis of rotation 6. The inner upper part-winding overhang 16c is the upper part-winding overhang 16c disposed closest to the laminated stator core 8 and therefore at the same time also the upper part-winding overhang 16c farthest from the rotating anode 2, viewed in the direction of the axis of rotation 6. In general, the upper part-winding overhangs 16 additionally also comprise at least one middle upper part-winding overhang 16b disposed between the outer upper part-winding overhang 16a and the inner upper part-winding overhang 16c.

The lower part-winding overhangs 17 are normally of similar design. Viewed in the direction of the axis of rotation 6, the lower part-winding overhangs 17 are therefore also arranged one above the other so that they comprise at least one outer lower part-winding overhang 17a and one inner lower part-winding overhang 17c and in addition normally also comprise at least one middle lower part-winding overhang 17b. In this case the phases 13 of the winding system 12 normally comprise the same upper and lower part-winding overhang 16, 17 in each case. The phase 13a comprising the outer upper part-winding overhang 16a therefore normally also comprises at the same time the outer lower part-winding overhang 17a. Similar designs generally apply to the other phases 13b, 13c.

Figure 5:
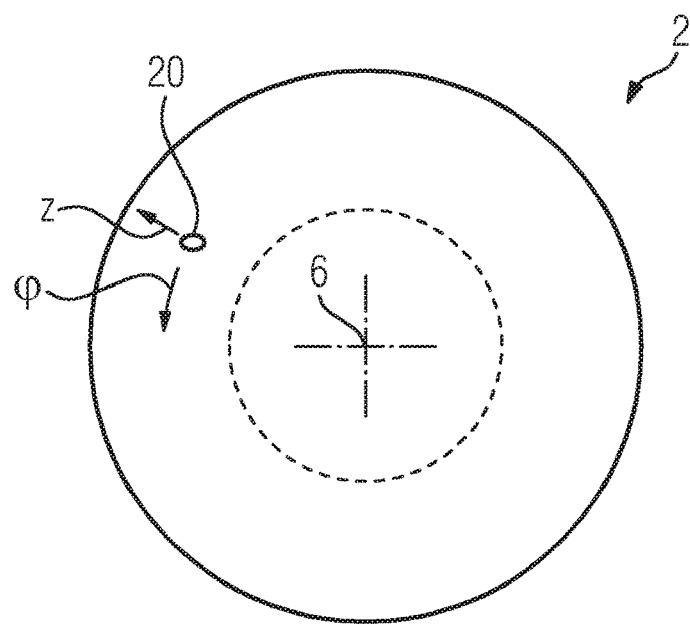
FIG. 5 shows a plan view of a rotating anode.

When the rotor 3 is operated, the stator 7 generates stray magnetic fields. The stray fields vary over time. This affects the electron beam 19 emitted by the cathode 18 of the X-ray arrangement via the Lorentz force (see FIG. 1). The location of the focal point 20 therefore varies over time, namely, as shown in FIG. 5, both in the circumferential direction φ and also, as shown in FIGS. 1 and 5, orthogonally thereto in another direction z. The other direction z follows the contour of the rotating anode 2. It is generally mixed in a radial-axial manner.

The less the stray fields generated by the stator 7 fluctuate, the smaller the amount of variation in the location of the focal point 20. During operation of the stator 7, the same phase voltages U are applied to the phases 13. The fluctuations of the stray fields generated by the stator 7 can therefore be minimized by designing the stator 7 such that when identical phase voltages Ua, Ub, Uc are applied to the individual phases 13a, 13b, 13c (see FIG. 3) the phases 13 each produce stray magnetic fields of identical magnitude.

Figure 6:
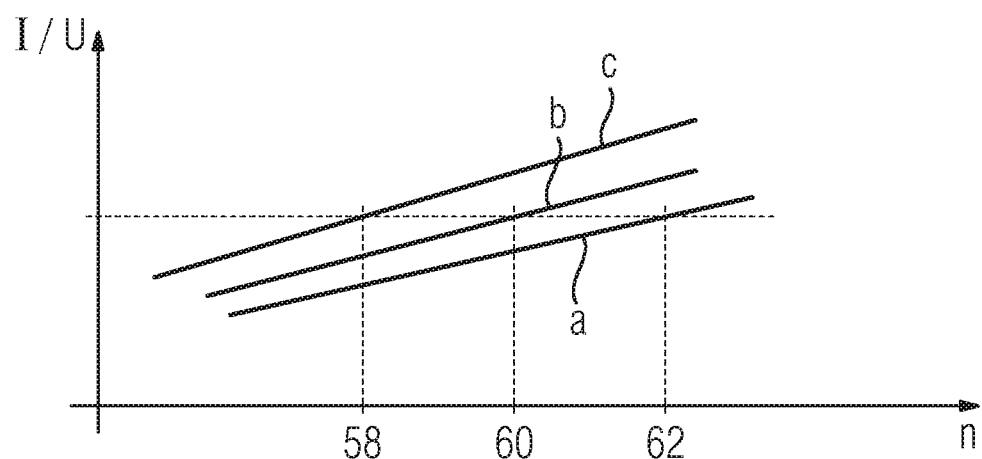
FIG. 6 shows a graph.

The stray magnetic fields are on the one hand proportional to the phase currents I caused by the phase voltages U and, on the other, dependent on the design of the laminated stator core 8. Equalization of the phase currents I can be achieved in particular by providing the phase 13a which comprises the outer upper part-winding overhang 16a with a larger number of turns 15 than the other phases 13b, 13c. Alternatively or additionally, equalization of the phase currents I can be achieved by providing the phase 13c which comprises the inner upper part-winding overhang 16c with a smaller number of turns 15 than the other phases 13a, 13b. For example, as shown in FIGS. 3 and 6, in the case of a specific design of the stator 7, the phase currents Ia, Ib, Ic can be equalized by providing the winding 14a of the phase 13a with n=62 turns 15, the winding 14b of the phase 13b with n=60 turns 15 and the winding 14c of the phase 13c with n=58 turns 15. In other designs, other numerical values for the number of turns n may obviously arise.

The number n of turns 15 of the windings 14 of the phases 13 is always an integer. It can therefore happen that the stray magnetic fields produced by the phases 13 are not of precisely equal magnitude. However, such remaining differences have to be accepted. For example, it is not possible to have 61.8 turns 15, but only either 61 or 62. However, the number n of turns 15 of the windings 14 of the phases 13 can be selected such that the residual fluctuations are as small as possible.

The adjustment of the turns 15 of the windings 14 of the phases 13 affects the fluctuation of the location of the focal point 20 both in the circumferential direction $\varphi$ and in the other direction z. In tests, it was possible to achieve a reduction in the fluctuation of the location of the focal point 20 in both directions $\varphi$, z by a factor of 3 compared to a conventional stator 7.

Figure 7:
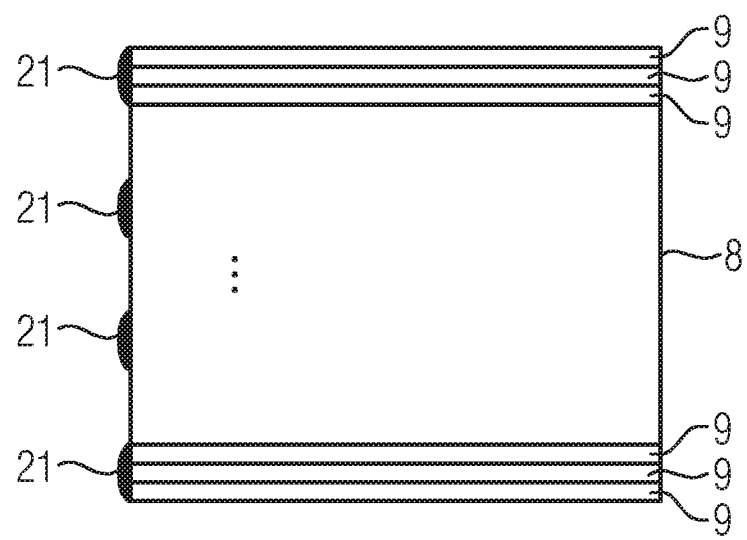
FIG. 7 shows a laminated stator core from the side.

Another possibility for influencing the stray magnetic fields and therefore the fluctuation of the location of the focal point 20 is the selective adjustment of the electrical interconnection of consecutive stator laminations 9 in the direction of the axis of rotation 6. For example, welded joints running 21 in the direction of the axis of rotation 6 can be broken. This is illustrated in FIG. 7, left. However, the triple break shown there is purely by way of example only. It is even possible for such welded joints to be dispensed with completely. This is illustrated in FIG. 7, right. In this case the stator laminations 9 are fixed by the mounting of the stator 7 inside the X-ray arrangement.

By adjusting the electrical interconnection of the stator laminations 9, in particular the fluctuation of the location of the focal point 20 can be reduced in the other direction z. However, a reduction is also produced in the circumferential direction $\varphi$. In tests it was possible to achieve a reduction in the fluctuation of the location of the focal point 20 in the other direction z by a factor of 3 and in the circumferential direction $\varphi$ by a factor of 1.5 to 2.

To summarize, embodiments of the present invention therefore relates to the following situation:

An X-ray arrangement comprises a vacuum vessel 1 in which are disposed a rotating anode 2 and a rotor 3 of an electrical machine. The rotating anode 2 and the rotor 3 are non-rotatably interconnected and are rotatably mounted in the vacuum vessel 1 so that the rotating anode 2 and the rotor 3 can be rotated about an axis of rotation 6. Viewed in the direction of the axis of rotation 6 there is disposed in the region of the rotors 3 a stator 7 which encloses the vacuum vessel 1 externally in a radial manner with respect to the axis of rotation 6. The rotor 3 and the stator 7 together constitute a rotary electrical machine by which the rotating anode 2 is rotated about the axis of rotation 6. The stator 7 has a laminated core 8 which, viewed orthogonally to the axis of rotation 6, has a yoke 10 running around the axis of rotation 6 and from which stator teeth 11 extend onto the axis of rotation 6. Disposed in the spaces between the stator teeth 11 of the laminated stator core 8 is a winding system 12 having a plurality of phases 13. The winding system 12 comprises windings 14, the individual turns 15 of which engage over a plurality of stator teeth 11. The stator 7 is designed such that when identical phase voltages U are applied to the individual phases 13, the phases 13 produce stray magnetic fields of identical magnitude in each case.

Embodiments of the present invention have one or more of many advantages. In particular, the stator 7 can be manufactured in a conventional, simple, reliable and inexpensive manner and yet the stray magnetic fields can be optimized so that only very slight fluctuations occur over time. This is achieved in particular by the selective equalization of the ohmic resistances and above all of the inductances of the phases 13 of the winding system 12.

Although the invention has been illustrated and described in detail by the preferred example embodiment, embodiments of the invention is not limited by the examples disclosed and other variations will be apparent to persons skilled in the art without departing from the scope of protection sought for the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray arrangement, comprising:
   a vacuum vessel, a rotating anode and a rotor of an electrical machine being non-rotatably interconnected rotatably mounted in the vacuum vessel such that the rotating anode and the rotor are rotatable about an axis of rotation, wherein, viewed in a direction of an axis of rotation, a stator is disposed in a region of the rotor, externally enclosing the vacuum vessel in a radial manner with respect to the axis of rotation, wherein the rotor and the stator together constitute a rotary electrical machine by which the rotating anode is rotatable about the axis of rotation, wherein the stator includes a laminated core which, viewed orthogonally to the axis of rotation, includes a yoke running around the axis of rotation and from which stator teeth extend onto the axis of rotation, and wherein a winding system, including a plurality of individual phases, is disposed in spaces between the stator teeth of the laminated stator core, the winding system including windings, individual turns of the windings each being configured to respectively engage over a plurality of the stator teeth, and the stator being designed such that when identical phase voltages are applied to the individual phases of the winding system, the individual phases are each respectively configured to produce stray magnetic fields of identical magnitude.

2. The X-ray arrangement of claim 1, wherein an individual phases of the winding system, viewed in a direction of the axis of rotation, each respectively include, above the laminated stator core, an upper part-winding overhang and, below the laminated stator core, a lower part-winding overhang, the upper part-winding overhangs being disposed relatively closer to the rotating anode than the lower part-winding overhangs, the upper part-winding overhangs, viewed in a direction of the axis of rotation, being disposed one above another such that the upper part-winding overhangs each include at least one outer upper part-winding overhang and one inner upper part-winding overhang, and the outer upper part-winding overhang, viewed in the direction of the axis of rotation, being the upper part-winding overhang relatively farthest from the laminated stator core and the inner upper part-winding overhang being the upper part-winding overhang relatively farthest from the rotating anode.

3. The X-ray arrangement of claim 2, wherein an individual phase of the plurality of individual phases of the winding system, including the outer upper part-winding overhang, including a relatively larger number of turns than the other individual phases of the plurality of individual phases of the winding system.

4. The X-ray arrangement of claim 3, wherein
an individual phase of the plurality of individual phases of the winding system including the inner upper part-winding overhang including a relatively smaller number of turns than other individual phases of the plurality of individual phases of the winding system.

5. The X-ray arrangement of claim 4, wherein the laminated stator core includes a plurality of stator laminations which, viewed in the direction of the axis of rotation, are stacked one on top of another, and wherein an electrical interconnection of successive stator laminations, of the plurality of stator laminations, in the direction of the axis of rotation, is at least partially broken.

6. The X-ray arrangement of claim 3, wherein the laminated stator core includes a plurality of stator laminations which, viewed in the direction of the axis of rotation, are stacked one on top of another, and wherein an electrical interconnection of successive stator laminations, of the plurality of stator laminations, in the direction of the axis of rotation, is at least partially broken.

7. The X-ray arrangement of claim 2, wherein the laminated stator core includes a plurality of stator laminations which, viewed in the direction of the axis of rotation, are stacked one on top of another, and wherein an electrical interconnection of successive stator laminations, of the plurality of stator laminations, in the direction of the axis of rotation, is at least partially broken.

8. The X-ray arrangement of claim 1, wherein the laminated stator core includes a plurality of stator laminations which, viewed in the direction of the axis of rotation, are stacked one on top of another, and wherein an electrical interconnection of successive stator laminations, of the plurality of stator laminations, in the direction of the axis of rotation, is at least partially broken.

9. The X-ray arrangement of claim 2, wherein an individual phase of the plurality of individual phases of the winding system including the inner upper part-winding overhang including a relatively smaller number of turns than other individual phases of the plurality of individual phases of the winding system.

10. The X-ray arrangement of claim 9, wherein the laminated stator core includes a plurality of stator laminations which, viewed in the direction of the axis of rotation, are stacked one on top of another, and wherein an electrical interconnection of successive stator laminations, of the plurality of stator laminations, in the direction of the axis of rotation, is at least partially broken.

* * * * *